United States Patent Office
3,412,097
Patented Nov. 19, 1968

3,412,097
INDOLE DERIVATIVES
Gerardus J. B. Corts, Haarlem, Netherlands, assignor to N.V. Koninklijke Pharmaceutische Fabrieken v/h Brocades Stheeman en Pharmacia, Amsterdam, Netherlands, a corporation of the Netherlands
No Drawing, Filed May 17, 1965, Ser. No. 456,510
Claims priority, application Great Britain, Sept. 7, 1964, 36,618/64
6 Claims. (Cl. 260—293)

ABSTRACT OF THE DISCLOSURE

According to the present invention, there are provided the new piperidinoalkylindoles of the general formula

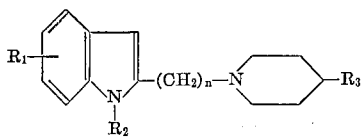

wherein $R_1$ represents a hydrogen or chlorine atom, $R_2$ represents a hydrogen or lower alkyl group, $R_3$ represents a lower alkyl or chloro or methylenedioxy-substituted phenyl, and $n$ represents 1 or 2.

The aforesaid piperidinoalkylindoles are therapeutically active compounds having analgesic and muscle relaxant activity.

---

This invention relates to new therapeutically useful piperidinoalkylindoles and their acid-addition salts, to a process for their preparation and to pharmaceutical compositions containing them.

According to the present invention, there are provided the new piperidinoalkylindoles of the general formula:

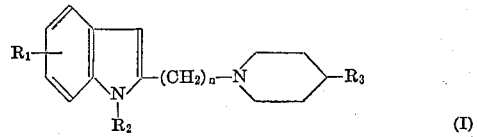

(I)

wherein $R_1$ represents a hydrogen or halogen atom, or a lower alkoxy group, $R_2$ represents a hydrogen atom or a lower alkyl, aryl (e.g., phenyl) or aryl (lower alkyl) group, $R_3$ represents a hydrogen atom, or a substituted or unsubstituted aliphatic (e.g., lower alkyl), aromatic (e.g., phenyl) or aralkyl (e.g., benzyl) hydrocarbon radical, and $n$ represents 1 or 2. Examples of substituents which may be present on a group $R_3$ are halogen (e.g., chloro or bromo) atoms and the methylenedioxy and lower alkyl groups. By the terms "lower alkyl" and "lower alkoxy," as used in this specification, is meant, straight or branched alkyl or alkoxy groups, respectively, having at most six carbon atoms.

The aforesaid piperidinoalkylindoles are therapeutically active compounds having analgesic and muscle relaxant activity. When used for therapeutic purposes, they may be employed as such or in the form of non-toxic acid-addition salts, i.e., salts which are not harmful to the animal organism when used in therapeutic doses, derived from inorganic acids such as the hydrohalic acids (e.g., hydrochloric and hydrobromic acids), and organic acids such as maleic, fumaric, citric, oxalic, lactic, tartaric, acetic, succinic and pamoic acids. Preferred compounds are those of Formula I in which $R_3$ is other than hydrogen and, in particular, those in which $R_1$ is hydrogen, $R_2$ is hydrogen or methyl, and $R_3$ is methyl or p-chlorophenyl.

According to a feature of the present invention, the piperidinoalkylindoles of Formula I are prepared by the process which comprises reducing the carbonyl group or groups of an indole derivative of the general formula:

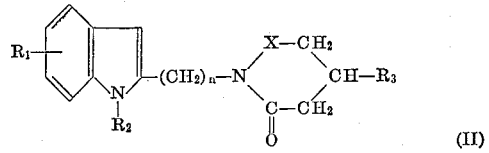

(II)

(wherein X represents a —CO— or —CH$_2$— group, and the other symbols are as hereinbefore defined) to a methylene, i.e., —CH$_2$—, group by methods known per se for such a reduction. Reduction of the carbonyl group(s) may be effected with a reducing agent such as lithium aluminum hydride, which is the preferred method, by electrolytic reduction, by catalytic reduction (preferably with a copper-chromite catalyst), with an alkali metal in an alcohol, or with sodium borohydride in the presence of aluminium chloride.

The indole starting materials of Formula II in which X represents a carbonyl group can be prepared by reacting a 2-indolylalkylamine of the formula:

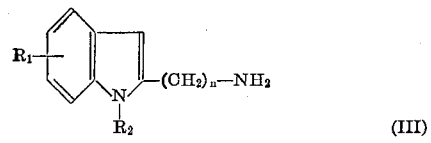

(III)

with a glutaric anhydride of the formula:

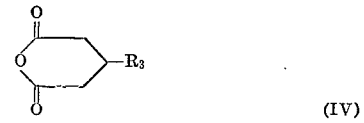

(IV)

to form a glutaric acid derivative of the formula:

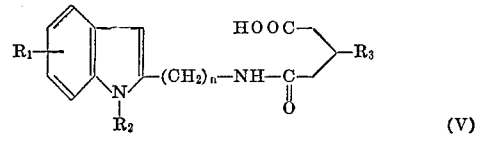

(V)

and dehydrating the glutaric acid derivative preferably using acetic acid anhydride, to form a piperid-2,5-dione derivative of the formula:

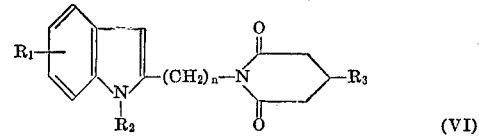

(VI)

the various symbols being as hereinbefore defined.

The indole starting materials of Formula II in which X represents a methylene group can be prepared by reacting a 2-indolylalkylamine of Formula III with an ester of a 5-bromovaleric acid of the formula:

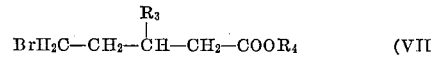

(VII)

(wherein $R_3$ is as hereinbefore defined and $R_4$ represents a lower alkyl group) in the presence of potassium carbonate and a crystal of potassium iodide to form a piperid-2-one derivative of the formula:

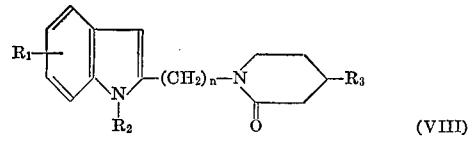

(VIII)

wherein the various symbols are as hereinabove defined.
Acid-addition salts of the compounds of Formula I are prepared in manner known per se, e.g., by dissolving the base in an inert organic solvent such as diethyl ether or benzene and adding an equivalent quantity of the acid suitably dissolved in the same solvent.

In those instances where the 2-indolylalkylamines of Formula III in which $n=2$ are new, they can be prepared according to the procedure described and exemplified in our copending application No. 459,979, filed on an even date with this application and now abandoned. The new 2-indolylalkylamines of Formula III in which $n=1$ can be prepared by reacting a 2-indolyl-carbonyl halide (preferably chloride) of the formula:

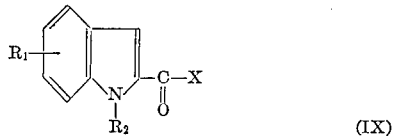

(wherein $R_1$ and $R_2$ are as hereinbefore defined), X is a holagen (i.e., chloro or bromo), the preparation of which is described and eexemplified in copending application No. XA31, filed on an even date with this application, with ammonia to form an amide of the formula:

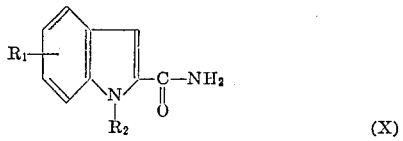

(wherein $R_1$ and $R_2$ are as hereinbefore defined), and reducing the carbonyl group in the amide to methylene by methods known per se, e.g., with a reducing agent such as lithium aluminium hydride.

By the term "methods known per se" as used in this specification is meant methods heretofore used or described in the chemical literature.

The following examples, in which the temperatures mentioned in degrees centigrade and the percentage yields mentioned are related to the theoretical yield, illustrate the preparation of compounds of the invention.

EXAMPLE 1

Preparation of 2-{2-[4-(3,4-methylenedioxy-phenyl)-piperid-1-yl]-ethyl}indole 3.6 g. of 1-[2-(2-indolyl)ethyl]-4-(3,4 - methylenedioxy-phenyl)piperid-2-one in the form of a suspension in 60 ml. of anhydrous tetrahydrofuran is added slowly to a suspension of 3.5 g. of lithium aluminium hydride in 50 ml. of the same solvent. The mixture is refluxed, while stirring, for 5½ hours. After treatment with a mixture of 10 ml. of water and 25 ml. of tetrahydrofuran, the mixture is filtered using a suction pump and with the aid of Hyflo. The filtrate is concentrated by evaporation of the solvent. The residue is mixed with diethyl ether, washed with water and dried. A solution of maleic acid in diethyl ether is added to the filtrate. The resultant oil crystallizes slowly. After crystallization from methanol, there is obtained 1.9 g. (yield 41%) of 2-{2-[4-(3,4-methylenedioxy-phenyl)-piperid-1-yl]ethyl}indole maleate, melting point 150–153°.

Analysis.—Calc'd for $C_{26}H_{28}N_2O_6$: C, 67.23%; H, 6.07%; N, 6.03%. Found: C, 67.6%; H, 6.3%; N, 6.2%.

EXAMPLE 2

Preparation of 2-[2-(4-methyl-piperid-1-yl)ethyl]indole

Following the procedure described in Example 1 but substituting an equivalent amount of 1-[2-(2-indolyl)ethyl]-4-methylpiperid-2-one for the 1-[2-(2-indolyl)-ethyl]-4-(3,4-methylenedioxy - phenyl)piperid-2-one, 2-[2-(4-methyl-piperid-1-yl)ethyl]indole is prepared in the form of the maleate; melting point after crystallization from methanol 164–166°. Yield 50%.

Analysis.—Calc'd for $C_{20}H_{26}N_2O_4$: C, 67.01%; H, 7.31%; N, 7.82%. Found: C, 66.8%; H, 7.2%; N, 7.7%.

EXAMPLE 3

(a) Preparation of N-[2-indolyl-methyl]-3-(p-chlorophenyl)-glutaric amide acid

To a solution of 10.2 g. of 2-aminoethyl-indole in anhydrous benzene is added a solution of 15.7 g. of 3-(p-chlorophenyl)-glutaric acid anhydride in the same solvent. The solid precipitate is filtered by suction and dissolved in a dilute solution of sodium carbonate in water. The water layer is filtered and acidified with 2 N hydrochloric acid. The product is washed with water and dried. There is obtained 22 g. (yield 85%) of N-[2-indolyl-methyl]-3-(p-chlorophenyl)-glutaric amide acid, melting point 174–177°. The crude product is used in the next step without further purification. For analysis purposes, a small quantity is purified. The crude product is dissolved in ethanol. After addition of diethyl ether and cooling, the product crystallizes again, melting point 177–179°.

Analysis.—Calc'd for $C_{20}H_{19}N_2O_3Cl$: C, 64.77%; H, 5.16%; N, 7.55%. Found: C, 65.0%; H, 5.0%; N, 7.3%.

(b) Preparation of N-[-indolyl-methyl]-3-(p-chlorophenyl)-glutaric imide.

10 g. of N[2-indolyl-methyl]-3-(p-chlorophenyl)-glutaric amide acid is refluxed for one hour with 30 ml. of acetic acid anhydride, resulting in the dissolution of the amide acid. After cooling, a solid crystallizes. After addition of 30 ml. of anhydrous diethyl ether, the product is filtered off using a suction pump. There is obtained 6.5 g. of N - [2-indolyl-methyl]-3-(p-chlorophenyl) - glutaric imide after crystallization from a mixture of dioxane and ethanol. Yield 68.5%; melting point 205–206°.

Analysis.—Calc'd for $C_{20}H_{17}N_2O_2Cl$: C, 68.08%; H, 4.85%: N. 7.94%. Found: C, 67.8%; H, 4.8%; N, 7.8%.

(c) Preparation of 2-{[4-(p-chlorophenyl)piperid-1-yl]methyl}-indole

A solution of 6 g. of N-[2-indolyl-methyl]-3-(p-chlorophenyl)-glutaric imide in 200 ml. of anhydrous tetrahydrofuran is slowly added, with stirring, to a suspension of 4 g. of lithium aluminium hydride in 100 ml. of the same solvent. After completion of the addition, the mixture is boiled under reflux for two hours. The reaction mixture is decomposed with water and filtered using a suction pump and with the aid of Hyflo. The filtrate is concentrated by evaporation of the solvent under reduced pressure and the residue is dissolved in diethyl ether. The etheral solution is washed and dried and acidified with a solution of maleic acid in ethanol. The resultant salt is crystallized from ethanol. There is obtained 5.5 g. (yield 73%) of 2-{[4-(p-chlorophenyl)piperid-1-yl]methyl}indole maleate, melting point 120–122°.

Analysis.—Calc'd for $C_{24}H_{25}N_2O_4Cl$: C, 65.37%; H, 5.71%; N, 6.35%. Found: C, 65.1%; H, 5.5%; N, 6.3%.

EXAMPLE 4

(a) Preparation of N-[2-indolyl-methyl]-3-methylglutaric amide acid

Following the procedure described in Example 3, step (a), but substituting an equivalent amount of 3-methylglutaric acid anhydride for the 3-(p-chlorophenyl)-glutaric acid anhydride, N-[2-indolyl-methyl]-3-methyl-glutaric amide acid is prepared. Yield 50%; melting point 126–128°.

Analysis.—Calc'd for $C_{15}H_{18}N_2O_3$: C, 65.67%; H, 6.61%; N, 10.21%. Found: C, 65.6%; H, 6.7%; N, 10.2%.

(b) Preparation of N-[2-indolyl-methyl]-3-methylglutaric imide

Following the procedure described in Example 3, step (b), but substituting an equivalent amount of N-[2-indolyl-methyl]-3-methyl-glutaric amide acid for the N-[2-indolyl-methyl]-3-(p-chlorophenyl)-glutaric amide acid, N-[2-indolyl-methyl]-3-methyl-glutaric imide is prepared. Yield 81%; melting point 229–231°.

*Analysis.*—Calc'd for $C_{15}H_{16}N_2O_2$: C, 70.28%; H, 6.29%; N, 10.92%. Found: C, 70.1%; H, 6.2%, N, 11.2%.

(c) Preparation of 2-[(4-methyl-piperid-1-yl)methyl]indole

Following the procedure described in Example 3, step (c), but substituting an equivalent amount of N-[2-indolyl-methyl]-3-methyl-glutaric imide for the N-[2-indolyl-methyl]-3-(p-chlorophenyl)-glutaric imide, 2-[(4-methyl-piperid-1-yl)methyl]indole maleate is prepared. Yield 54%; melting point after crystallization from ethanol 170–173°.

*Analysis.*—Calc'd for $C_{19}H_{24}N_2O_4$: C, 66.25%; H, 7.02%; N. 8.13%. Found: C, 66.4%; H, 7.1%; N, 8.1%.

EXAMPLE 5

Preparation of 2-{2-[4-(p-chlorophenyl)piperid-1-yl]ethyl}indole 11.2 g. of isotrpytamine, 19.71 g. of Δ-bromo-β-(4'-chlorophenyl)ethyl valerate, 8.3 g. potassium carbonate and a crystal of potassiumiodide were refluxed in 200 ml. xylene for 23 hours. The warm mixture was filtrated, the residue washed with boiling absolute xylene, toluene and acetone. 9 g. of crude material were obtained; the melting point was 223–227°. After recrystallization from an ethanol-dioxane mixture, the yield was 7.5 g. of 1-[2-(2-indolyl)ethyl] - 4 - p - chlorophenyl-piperid-2-one with a melting point of 229–231° C.

*Analysis.*—Calc'd for $C_{21}H_{21}O_1N_2Cl$: C, 71.47%; H, 6.00%; N, 7.95%; O, 4.54%. Found: C, 71.49%; H, 6.28%; N, 7.81%.

7 g. of 1-[2-(2-indolyl)ethyl]-4-p-chlorophenyl-piperid-2-one in 120 ml. of tetrahydrofuran were treated with 7 g. of lithium aluminium hydride in 100 ml. tetrahydrofuran. The reaction mixture was refluxed for 5.5 hours and decomposition was performed with 20 ml. water in tetrahydrofuran. The residue was filtered over Hyflo and washed with dry tetrahydrofuran. The solvent was evaporated, the residue dissolved in ether and washed with water. After drying and addition of maleic acid a crude product was obtained, which was recrystallized from methanol. The yield was 5.5 g. of 2-{2-[4-(p-chlorophenyl)piperid-1-yl]ethyl}indole maleate, the melting point 158–159°.

EXAMPLE 6

5-chloro-2-{2-[4-(3,4-methylenedioxy-phenyl)piperid-1-yl]ethyl}-indole

Following the procedure of Example 1, but utilizing an equivalent molar quantity of 1-{2-[2-(5-chloro)indolyl]ethly}-4-(3,4-methylenedioxy-phenyl)piperid-2-one in lieu of 1 - [2 - (2 - indolyl)ethyl] - 4 - (3,4 - methylenedioxy-phenyl)piperid-2-one, the desired product is obtained.

EXAMPLE 7

2-{2-[4-(3,4-methylenedioxy-phenyl)piperid-1-yl]ethyl}-1-methyl indole

Following the procedure of Example 1, but substituting an equivalent molar quantity of 1-{2-[2-(1-methyl)indolyl]ethyl} - 4 - (3,4 - methylenedioxy - phenyl)piperid-2-one in lieu of 1-[2-(2-indolyl)ethyl]-4-(3,4-methylenedioxy-phenyl)piperid-2-one, the desired product is recovered.

The invention includes within its scope pharmaceutical preparations comprising at least one of the therapeutically active compounds of Formula I, or non-toxic acid-addition salts thereof, in association with a pharmacologically acceptable carrier.

The preparations may take any of the forms customarily employed for administration of therapeutically active substances but the preferred types are those suitable for oral administration and especially tablets, pills and capsules including the substances. The tablets and pills may be formulated in manner known per se with one or more pharmacologically acceptable diluents or excipients, for example lactose or starch and include materials of a lubricating nature, for example calcium stearate. Capsules made of absorable material, for example gelatin, may contain the active substance alone or in admixture with a solid or liquid diluent. Liquid preparations may be in the form of suspensions, emulsions, syrups or elixirs of the active substance in water or other liquid medium commonly used for making orally acceptable pharmaceutical formulations, such as liquid paraffin, or a syrup or an elixir base. The active substance may also be made up in a form suitable for parenteral administration, i.e., as a suspension or emulsion in sterile water or an organic liquid usually employed for injectable preparations, for example a vegetable oil such as olive oil, or a sterile solution in an organic solvent.

While there have been described various embodiments of the invention, the compositions and methods described are not intended to be understood as limiting the scope of the invention, as it is realized that changes therein are possible and it is further intended that each element recited in any of the following claims is to be understood as referring to all equivalent elements for accomplishing substantially the same results in substantially the same or equivalent manner, it covering the invention broadly in whatever form its principle may be utilized.

What is claimed is:

1. A compound of the formula

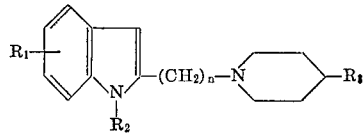

wherein $R_1$ is selected from the group consisting of hydrogen and chloro; $R_2$ is selected from the group consisting of hydrogen and lower alkyl; $R_3$ is selected from the group consisting of lower alkyl, chlorophenyl and methylene dioxyphenyl; and $n$ is 1 to 2, and pharmaceutically acceptable salts thereof.

2. 2 - {2 - [4 - (3,4-methylenedioxy-phenyl)piperid-1-yl]ethyl}indole.
3. 2-[-(4-methyl-piperid-1-yl)ethyl]indole.
4. 2-{[4-(p-chlorophenyl)piperid-1-yl]methyl}indole.
5. 2-[(4-methyl-piperid-1-yl)methyl]indole.
6. 2-{2-[4-(p-chlorophenyl)piperid-1-yl]ethyl}indole.

References Cited

UNITED STATES PATENTS 3,152,135  10/1967  Shovel et al. _____ 260—293.2
3,238,215  3/1966  Zenitz _____ 260—293

HENRY R. JILES, *Primary Examiner.*

E. LEWIS, *Assistant Examiner.*